(12) United States Patent
Bartos et al.

(10) Patent No.: US 10,440,035 B2
(45) Date of Patent: Oct. 8, 2019

(54) IDENTIFYING MALICIOUS COMMUNICATION CHANNELS IN NETWORK TRAFFIC BY GENERATING DATA BASED ON ADAPTIVE SAMPLING

(71) Applicant: Cisco Technology, Inc., San Jose, CA (US)

(72) Inventors: Karel Bartos, Prague (CZ); Martin Rehak, Prague (CZ)

(73) Assignee: Cisco Technology, Inc., San Jose, CA (US)

(*) Notice: Subject to any disclaimer, the term of this patent is extended or adjusted under 35 U.S.C. 154(b) by 281 days.

(21) Appl. No.: 14/955,480

(22) Filed: Dec. 1, 2015

(65) Prior Publication Data

US 2017/0155668 A1    Jun. 1, 2017

(51) Int. Cl.
*H04L 29/06* (2006.01)
*H04L 12/26* (2006.01)

(52) U.S. Cl.
CPC ........ *H04L 63/1416* (2013.01); *H04L 43/024* (2013.01); *H04L 63/0236* (2013.01); *H04L 2463/144* (2013.01)

(58) Field of Classification Search
CPC ................................ H04L 47/00; G06F 21/55
See application file for complete search history.

(56) References Cited

U.S. PATENT DOCUMENTS

| | | |
|---|---|---|
| 8,204,984 B1 | 6/2012 | Aziz et al. |
| 8,539,582 B1 | 9/2013 | Aziz et al. |
| 8,737,221 B1* | 5/2014 | Jilani .................. H04L 47/2416 370/235 |
| 8,826,438 B2 | 9/2014 | Perdisci et al. |
| 9,374,383 B2* | 6/2016 | Sourek .................... H04L 67/10 |
| 2004/0015582 A1* | 1/2004 | Pruthi ................... H04L 41/142 709/224 |
| 2006/0075093 A1* | 4/2006 | Frattura .............. H04L 41/0681 709/224 |

(Continued)

OTHER PUBLICATIONS

Gu et al., "BotSniffer: Detecting Botnet Command and Control Channels in Network Traffic", 16th Annual Network & Distributed System Security Symposium, San Diego, CA, Feb. 2008, 18 pages.

(Continued)

*Primary Examiner* — Edward Zee
*Assistant Examiner* — Leynna T Truvan
(74) *Attorney, Agent, or Firm* — Edell, Shapiro & Finnan, LLC (57) ABSTRACT

Identifying malicious communications by generating data representative of network traffic based on adaptive sampling includes, at a computing device having connectivity to a network, obtaining a set of data flows representing network traffic between one or more nodes in the network and one or more domains outside of the network, wherein each data flow in the set of data flows includes a plurality of data packets. One or more features are extracted from the set of data flows based on statistical measurements of the set of data flows. The set of data flows are adaptively sampled based on at least the one or more features. Then, data representative of the network traffic is generated based on the adaptively sampling to identify malicious communication channels in the network traffic.

20 Claims, 6 Drawing Sheets

(56) References Cited

U.S. PATENT DOCUMENTS

2011/0149745 A1\* 6/2011 Filho .................. H04L 63/1416
370/242
2014/0282808 A1 9/2014 Beals et al.

OTHER PUBLICATIONS

Mai et al., "Is Sampled Data Sufficient for Anomaly Detection?", Oct. 25-27, 2006, Rio de Janeiro, Brazil, ICM '06, Proceedings of the 6th ACM SIGCOMM conference on Internet measurement, 12 pages.

Hohn et al., "Inverting Sampled Traffic", IMC '03, Proceedings of the 3rd ACM SIGCOMM conference on Internet measurement, Oct. 27-29, 2003, Miami Beach, FL, 12 pages.

Androulidakis et al., "Network anomaly detection and classification via opportunistic sampling" Network, IEEE, vol. 23, Issue 1, Jan.-Feb. 2009.

Carela-Espanol et al., "Analysis of the impact of sampling on NetFlow traffic classification", Computer Networks, vol. 55, Issue 5, Apr. 1, 2011, 32 pages.

Maiya et al., "Benefits of Bias: Towards Better Characterization of Network Sampling", KDD '11, Proceedings of the 17th ACM SIGKDD international conference on Knowledge discovery and data mining, Aug. 21-24, 2011 San Diego, CA, 9 pages.

Shomorony et al., "Sampling Large Data on Graphs", Signal and Information Processing (GlobalSIP), 2014 IEEE Global Conference, Dec. 3-5, 2014, Atlanta, GA, 4 pages.

Bartos et al., "Towards Efficient Flow Sampling Technique for Anomaly Detection", Traffic Monitoring and Analysis, 4th International Workshop, TMA 2012, Vienna, Austria, Mar. 12, 2012, 14 pages.

\* cited by examiner

IDENTIFYING MALICIOUS COMMUNICATION CHANNELS IN NETWORK TRAFFIC BY GENERATING DATA BASED ON ADAPTIVE SAMPLING

TECHNICAL FIELD

The present disclosure relates to network security.

BACKGROUND

Malicious botnets are one of the most potent threats to networking systems. To create malicious botnets, malware often establishes a network connection with a Command & Control (C2) server that is used by a botnet's originator (or "bot master") to control the botnet entities (bots) remotely. Different technologies and techniques make it difficult to uncover the C2 server. For example, a Domain Generation Algorithm (DGA) can generate many domains, with only a (frequently changing) subset being registered and employed. Once a malicious botnet is established, the malicious botnet may deploy a platform for performing malicious activities such as denial-of-service (DoS) attacks, information gathering, distributed computing, cyber fraud, malware distribution, unsolicited marketing, etc.

In view of the damage that botnets may cause, it is important to monitor and identify malicious botnets. However, the steady increase in network traffic and the increased complexity of transactions (due at least in part to the delivery of critical services from cloud data centers) has made it difficult to monitor all network traffic. Consequently, monitoring is frequently performed by sampling network traffic. There are two basic classes of sampling techniques: packet-based and flow-based. Packet-based sampling methods work on the level of network packets. Each packet is selected for monitoring with a predefined probability depending on the sampling method used. In flow-based sampling, the monitored traffic is aggregated into network flows and the sampling itself is applied to the whole flow, not to the particular packets.

DESCRIPTION OF EXAMPLE EMBODIMENTS

Overview

Techniques are provided herein for identifying malicious communication channels by generating data representative of network traffic based on adaptive sampling. These techniques may be embodied as a method, a system, and instructions in a computer-readable storage media to perform the method. According to at least one example embodiment, malicious communications are identified by generating data representative of network traffic based on adaptively sampling at a computing device having connectivity to a network. A set of data flows is obtained representing network traffic between one or more nodes in the network and one or more domains outside of the network, wherein each data flow in the set of data flows includes a plurality of data packets. One or more features are extracted from the set of data flows based on statistical measurements of the set of data flows. The set of data flows are adaptively sampled based on at least the one or more features. Then, data representative of the network traffic is generated based on the adaptively sampling to identify malicious communication channels in the network traffic.

Example Embodiments

Presented herein are techniques for identifying malicious communication channels in network traffic by generating data representative of the network traffic based on late, adaptive, flow-based sampling (also referred to herein as adaptive sampling, for simplicity). These techniques intentionally bias sampling of network traffic in order to ensure that sampled data includes data that is relevant to at least some malicious communication channels in network traffic. Consequently, malicious communication channels in the network, such as malicious communication channels associated with Command & Control (C2) networks, can be discovered. Based on the adaptive sampling, techniques presented herein may generate data representative of the malicious communication channels in order to construct (i.e., map or graph) representations of the malicious communication channels. More specifically, any individual (i.e., per-user or per-company) late, adaptive, flow-based traffic sampling substantially preserves a majority of malicious communications included therein. Multiple individual traffic samplings can be combined to provide an overall sampling sufficient to enable detection of most malicious communication channels in the network. Globally combining individual samples enables significant economies of scale while also enabling efficient data collection from on-premises devices.

Generally, adaptive sampling involves sampling network traffic based on features that are extracted or determined prior to the sampling in order to intentionally bias the sampling and capture rare data flows contained in the network traffic. Adaptive sampling is described in further detail below in connection with FIG. 2. The term "late" in the context of "late, adaptive, flow-based traffic sampling" is also described in more detail below in connection with FIG. 2.

Adaptive sampling is particularly suitable for discovery and graph reconstruction of malicious communications of C2 channels (i.e., botnet communications) in a network because late, adaptive, flow-based sampling preserves data necessary to reconstruct C2 networks of malicious software with graph structures of statistically anomalous, low probability connections while negating the need for extensive network monitoring and long-term storage of network and transaction logs. In some instances, a C2 channel reconstruction may be incomplete for an individual user's case, but the reconstructions for multiple users within a network will likely have enough overlap to enable recovery on a global level. Late, adaptive, flow-based sampling preserves this overlap. In some embodiments, late, adaptive, flow-based sampling optimizes the sampling of network traffic to maximize the efficiency and effectiveness of C2 network reconstruction. For example, in some embodiments, only 5-10% of telemetry (i.e., 5-10% of network traffic) is needed in order to provide accurate C2 channel reconstructions. Furthermore, due to the nature of C2 networks of common botnets, the C2 flows sampled from one network can be easily retrieved to analyze a second network.

Figure 1:
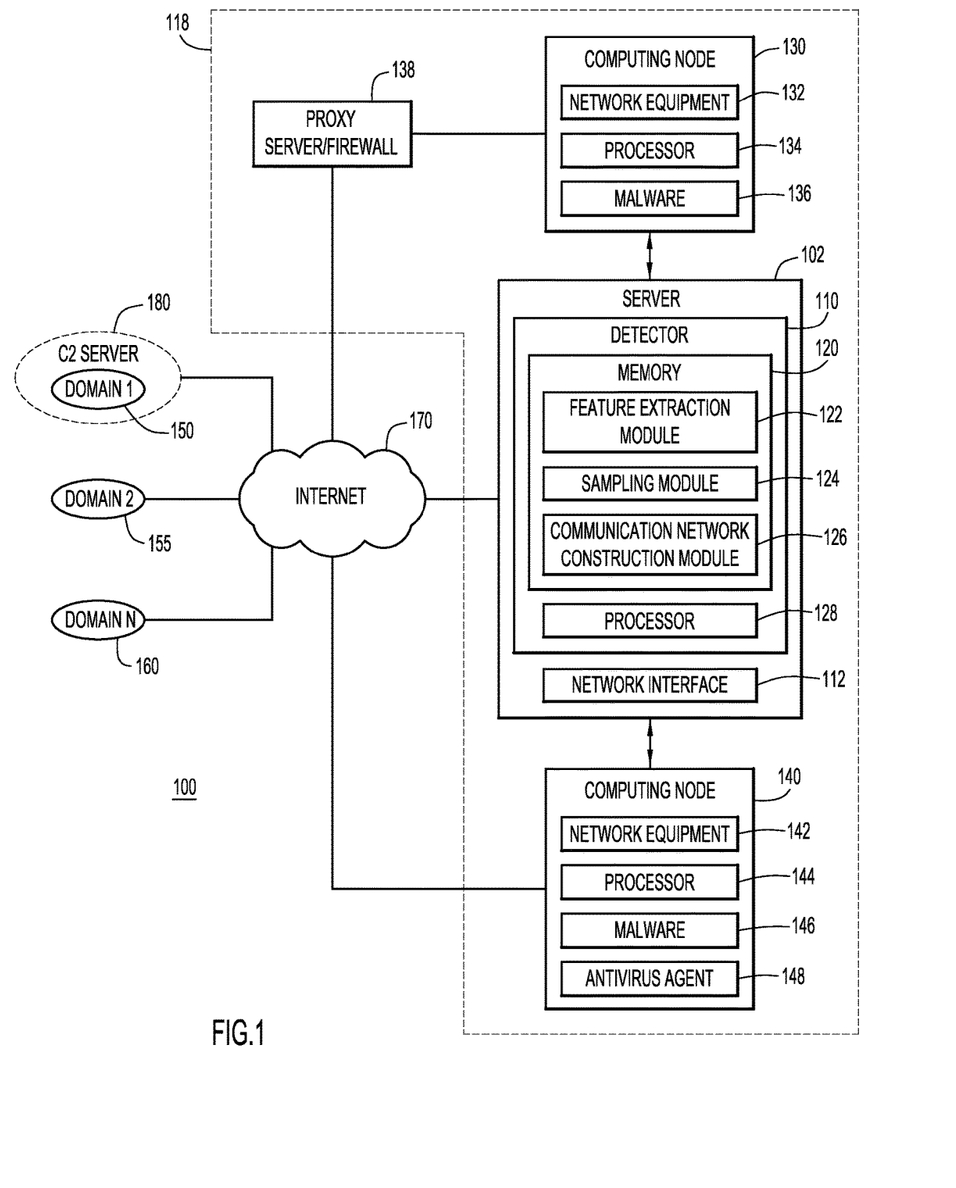
FIG. 1 is a block diagram illustrating a networking environment in which sampling and data generation methods presented herein may be employed, according to an example embodiment.

Reference is now made to FIG. 1, which illustrates a network environment 100 in which identification, data generation, and sampling methods presented herein may be employed, according to an example embodiment. Networking environment 100 includes a server 102, which may be a virtual or physical server, on which a detector 110 resides and is executed. The detector 110 includes a processor 128 and a memory 120 with a number of software modules, including a feature extraction module 122 configured to cause the detector 110 to capture features of network traffic (i.e., statistics) prior to sampling and a sampling module 124 configured to cause the detector 110 to perform late, adaptive, flow-based sampling of network traffic in network 118 based at least upon the captured features. The memory 120 also includes a communication network construction module 126 that is configured to cause the detector 110 to generate data representative of network traffic in network 118 based on the adaptive sampling to identify malicious communication channels in the network traffic.

The memory 120 may also be configured to store any extracted features, sampled data, generated data representative of network traffic (i.e., network constructions/reconstructions, and/or any other data). Generally, memory 120 may include read only memory (ROM), random access memory (RAM), magnetic disk storage media devices, optical storage media devices, flash memory devices, electrical, optical or other physical/tangible (e.g., non-transitory) memory storage devices. Thus, in general, the memory 120 may be or include one or more tangible (non-transitory) computer readable storage media (e.g., a memory device) encoded with software comprising computer executable instructions. For example, memory 120 may store instructions that may be executed by processor 128 for performing the adaptive sampling, data generation, and malicious communication identification, as described below with reference to the Figures. In other words, memory 120 may include instructions, that when executed by one or more processors, cause the one or more processors to carry out the operations described below in connection with the Figures.

Moreover, although each module described herein, such as the feature extraction module 122, the sampling module 124, and the communication network construction module 126 is shown stored in memory 120, each module described herein, may be hardware, or a combination of hardware and software. For example, each module may include and/or initiate execution of an application specific integrated circuit (ASIC), a Field Programmable Gate Array (FPGA), a circuit, a digital logic circuit, an analog circuit, a combination of discrete circuits, gates, or any other type of hardware, or combination thereof. Accordingly, as used herein, execution of a module by processor 128 can also refer to logic based processing by the module that is initiated directly or indirectly by the processor 128 to complete a process or obtain a result. Alternatively or additionally, each module can include memory hardware, such as at least a portion of a memory, for example, that includes instructions executable with a processor to implement one or more of the features of the module. When any one of the modules includes instructions stored in memory and executable with the processor, the module may or may not include a processor. In some examples, each unit may include only memory storing instructions executable with the processor 128 to implement the features of the corresponding module without the module including any other hardware.

Still referring to FIG. 1, the server 102 is connected, via a network interface 112 (e.g., a network interface card), to a number of computing nodes within a network 118, such as a computing node 130 and computing node 140. For simplicity, network 118 is only shown with two computing nodes (computing nodes 130 and 140); however, in other embodiments, the network 118, as well as the network environment 100, may be any desirable size. For example, the network 118 may be a university network of any size, a corporate network of any size, or any other such network. However, it may be counterintuitive to utilize the techniques presented herein on small networks where all of the network traffic can be monitored with relatively few resources, since sampling would be rendered unnecessary.

The network interface 112 also connects to Internet 170 such that server 102 is also connected to a number of domains outside of the network 118 via the Internet 170, such as domain 150, domain 155, and domain 160, at least one of which may be hosted by a C2 Server 180 (i.e., a botnet server). Computing node 130 and computing node 140 include network equipment 132 and network equipment 142, respectively, to provide similar connectivity; however, network equipment 132 connects to the Internet 170 via a proxy server/firewall 138 while network equipment 142 connects directly to the Internet 170. The proxy server/firewall 138 stores proxy logs of network communications to Internet 170 that are established via proxy server/firewall 138. Computing node 130 may also include a processor 134 and computing node 140 includes a processor 144.

In FIG. 1, malware 136 resides and is executed on computing node 130 while malware 146 resides and is executed on computing node 140. As used herein, malware 136 and malware 146 refer to executable files that each cause a computer/processor to execute instructions. The malware may be in a machine language, interpreted language, intermediate language, script language or any other language now known or hereinafter developed that causes a computer/processor to execute instructions. For simplicity, only computing device 130 is connected to Internet 170 via proxy server 138. However, in other embodiments, network 118 may include, but is not limited to, a plurality of computing devices, servers and other network devices that may also be infected by malware. Similarly, for simplicity, only computing node 140 includes an antivirus agent 148 that can monitor activities at the computing node 140 and report the activities to generate data flows, but any computing nodes may also include an antivirus agent 148.

Figure 2:
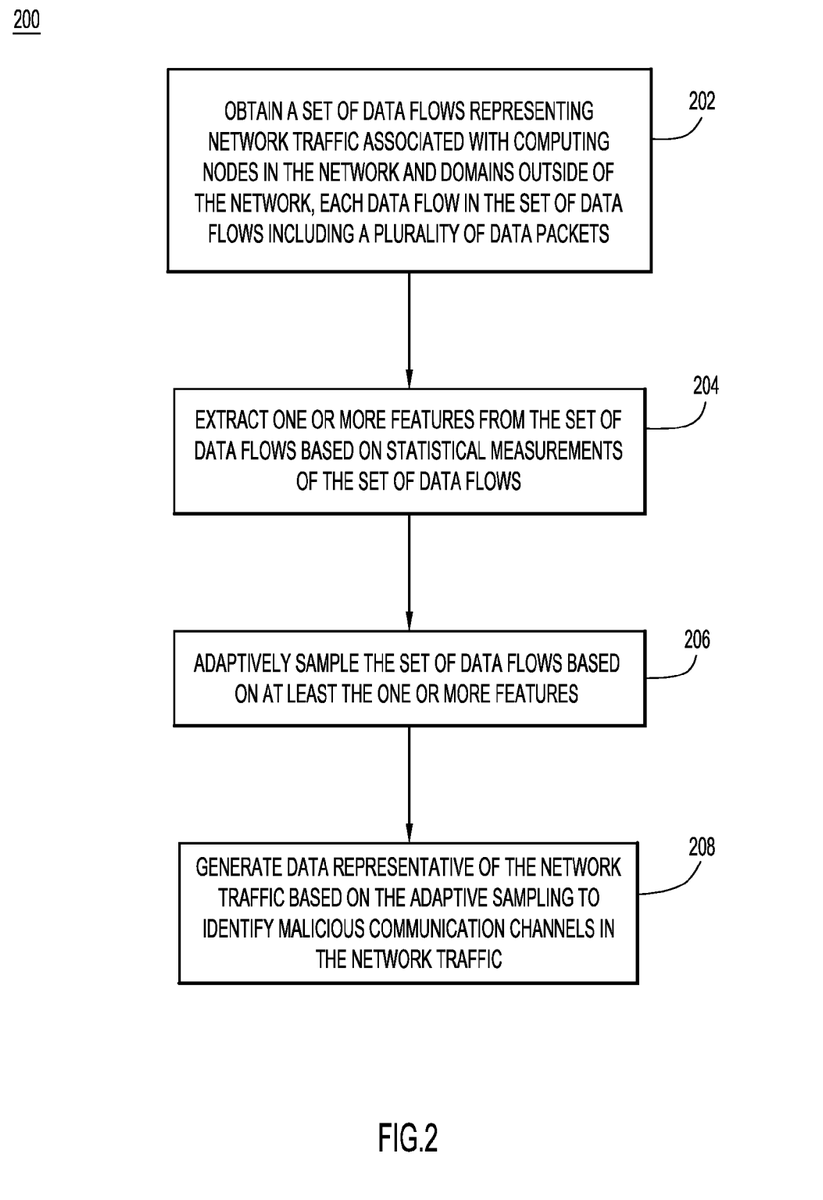
FIG. 2 is a high-level flowchart illustrating a process for identifying malicious communication channels in network traffic by generating data based on adaptive sampling, according to an example embodiment.

Now referring to FIG. 2, a flowchart is now described of a method 200 for identifying malicious communications by generating data representative of network traffic based on adaptive sampling, according to an example embodiment. Reference is also made to FIG. 1 for purposes of the description of FIG. 2. Initially, at step 202, a set of data flows representing network traffic in network 118 is obtained. The network traffic includes communications to and from the computing nodes (i.e., computing nodes 130 and 140) in network 118, including communications between one or more computing nodes and one or more domains outside of the network 118 (i.e., a communication between computing node 140 and one of domains 150, 155, and 160). Each data flow in the set of data flows includes a plurality of data packets and each of the packets includes information relating to the data flow. In many embodiments, the data flows are captured as NetFlow data; however, in some embodiments, the data flows may additionally or alternatively be obtained from proxy logs (such as those generated by proxy server/firewall 138). Although there are typically fewer proxy logs than NetFlow data (same network), the telemetry volumes are comparable due to dramatically higher average line/record size of proxy logs. Moreover, in some embodiments, the set of data flows may be obtained or collected in real time, such that the full set is obtained over a period of time. However, in other embodiments the set of data flows may be obtained at once, perhaps for a post-mortem analysis.

At step 204, features are extracted, such as by feature extraction module 122, from the full set of network traffic that was obtained at step 202. Examples of features used in the evaluation include count features and entropy features. Count features indicate a number of data flows that are related based on the statistical measurements, such as the number of flows with the same user, the number of flows directed towards the same hostname, etc. Meanwhile, entropy features indicate entropy of a certain statistical measurement over the set of data flows (i.e., how related flows differ). Generally, the features are based on statistical measurements of the set of data flows, such as: source Internet Protocol (IP) address of the data flow, destination IP address of the data flow, source port of the data flow, destination port of the data flow, protocol of the data flow, number of data packets transferred in the data flow, and timestamp of the data flow. For example, an entropy feature may indicate the entropy of bytes from a specific server IP address. Large feature values tend to indicate that the flows are related to visible and easily detectable network events, while smaller (or hidden) feature values tend to indicate that data flows are unique or rare and, thus, likely to be part of or associated with malicious communication channels. For example, if a data flow has a high count feature, this data flow is likely fairly common and, thus, likely not malicious.

Features are frequently extracted from a group of flows (such as all the flows from one host/port over the selected time period) prior to sampling, and are attached to each flow from the group. These features are extracted prior to sampling so that the sampling may be enriched based on the features built from the full, unbiased data. Since the computational cost related to the feature extraction and maintenance is typically significantly lower than the cost of the rest of the processing, extracting features in this manner provides significant savings of time and resources (both computing and financial).

At step 206, the sampling module 124 adaptively samples the obtained set of data flows with late, adaptive, flow-based sampling. The techniques presented herein utilize flow-based sampling because, as compared to packet-based sampling, flow-based sampling provides superior preservation of flow distributions. Moreover, one advantage of packet-based sampling is the decreased requirements for memory consumption and central processing unit (CPU) power on routers as well as the possibility to monitor higher network speeds. However, since techniques presented herein minimize the memory and CPU requirements by reducing the size of the required dataset, this advantage of packet-based sampling is substantially offset. Still further, although packet sampling is easy to implement, it introduces a serious bias in flow statistics and therefore is not suitable for retaining malicious behavior, such as C2 traffic.

That being said, flow-based sampling may also introduce a bias into flow statistics; however, this bias can be substantially corrected with late, adaptive, flow-based sampling. The word "late" in this term refers to features being extracted from the full traffic prior to the sampling, as discussed above with respect to step 204, while the word "adaptive" in this term refers to modifying the sampling rate of the data flows with respect to their feature values to maximize the variability and minimize redundancy. In other words, since the extracted features that tend to indicate data flows associated with malicious communications are known beforehand, sampling can be adaptively adjusted to optimize the preservation of data flows related to malicious communication channels in the sampling. Put still another way, late, adaptive, flow-based sampling generates an enriched random sample of the set of data flows with samples selected based on the one or more features by deliberately skewing a distribution of the random sample to cover statistically rare data flows included in the set of data flows. For example, data flows may be selected according to the size of their feature values: flows with large, visible and easily detectable feature values are sampled with a lower sampling rate, while flows with smaller (or hidden) feature values that are more likely to be symptoms of malicious behavior are sampled with a higher sampling rate.

Moreover, late, adaptive, flow-based sampling has near-linear complexity capable of processing very large datasets. Therefore, it can significantly decrease the computational demands of the system, allow the deployment of detectors and/or classifiers on high-speed network links, and enable efficient telemetry mining from a wide range of devices (especially next generation firewall devices). By comparison, methods which use spectral analysis to reduce the number of nodes to create a graph from a full data set typically have a high computational complexity and unknown behavior for signals with frequency higher then the Nyquist frequency.

At step 208, data representative of the network traffic (obtained in step 202) is generated based on the adaptive sampling to identify malicious communication channels in the network traffic. For example, data representative of C2 communication channels in the network can be generated such that a mapping of C2 communication channels in the network is generated and the malicious C2 communication channels can be identified. Using late, adaptive flow-based sampling reduces any bias in the sampling, which rapidly improves C2 reconstruction. Any remaining bias is mainly due to the possible elimination of specific flow records during sampling, but this does not affect the values of the features associated with the flow. Since features are frequently extracted from a group of flows, the information associated with the remaining flows correctly reflects the properties of all flows from the group, even if some flows are removed from the group by sampling.

However, even with adaptive sampling, some malicious communication channels may be missed simply because the data generated to identify the channels is generated based on sampling. Consequently, the impact of sampling may still be further reduced at step 208 by combining one individual sampling (i.e., for a user or an enterprise) with another. More specifically, a correlation algorithm may be applied to the sampled data to combine individual samplings of users, corporations, or any other entity that share malicious C2 channels. Generally, when a shared C2 communication channel to one or more domains is found across users or companies, the correlation algorithm may combine the generated data for these individuals into an overall data set. This correlation may reduce any loss introduced by an individual sampling and is described in more detail below with respect to FIGS. 4 and 5.

Figure 3A:
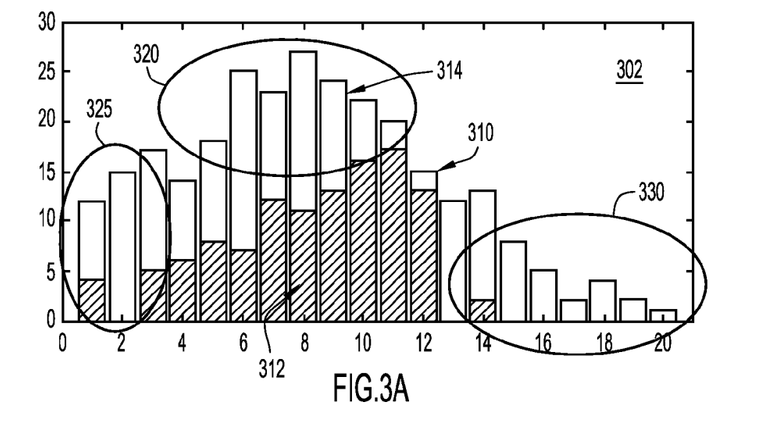
FIGS. 3A and 3B are diagrams depicting network traffic captured by conventional sampling methods.
Figure 3B:
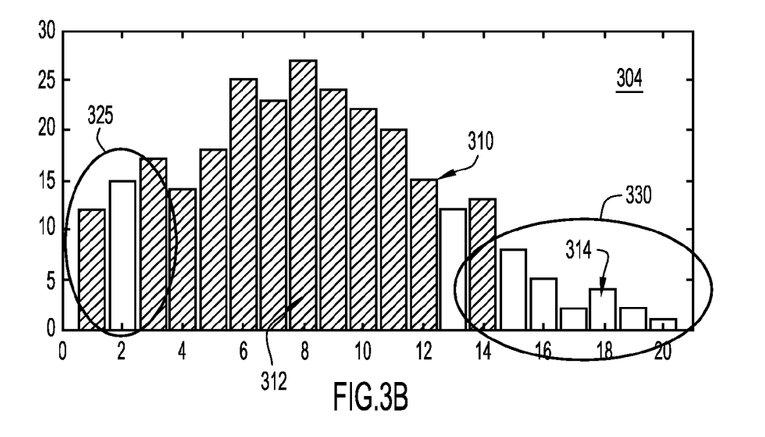
Figure 3C:
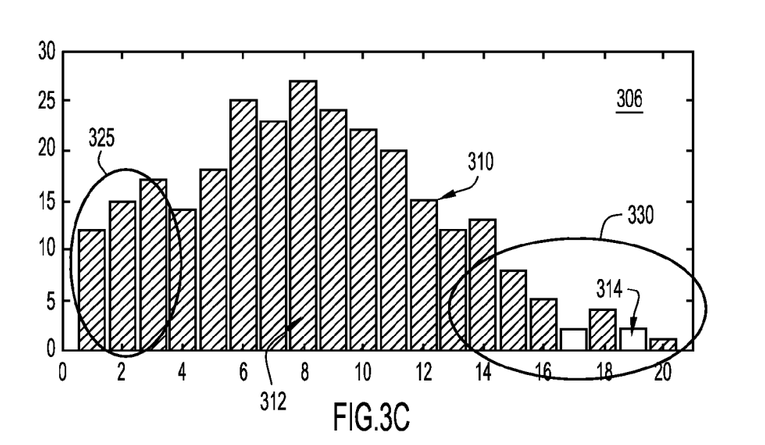
FIG. 3C is a diagram depicting feature distributions of network traffic captured by sampling methods presented herein, according to an example embodiment.

Now referring to FIGS. 3A-3C, graphs illustrating feature distributions of network traffic flows 310 captured by various sampling methods are now described. In FIGS. 3A-3C, the feature distributions of network traffic flows 310 are represented by the outline of the columns while the flows (and, thus, feature values) captured in the sampling are represented by the solid portions 312 of the columns. The flows 310 are plotted as a function of sample number (x-axis) vs. the feature value of that sample (y-axis). Thus, the shorter the column, the rarer the feature value (and possibly, the more likely the sample is to contain malicious communications). Notably, each of graph 302, graph 304, and graph 306 include non-solid portions 314 that indicate data flows that are not captured or represented by the sampling. This is because any sampling necessarily negatively impacts the detection processes. However, as is shown in FIG. 3C, late, adaptive, flow-based sampling may minimize, or at least reduce, the negative impact compared to conventional sampling methods that are shown in FIGS. 3A and 3B. Consequently, late, adaptive, flow-based sampling may minimize the negative impact on the detection or identification of malicious communication channels. For example, late, adaptive, flow-based sampling may minimize the negative impact on a reconstruction of C2 channels that is performed using the data generated based on the sampling.

More specifically, in FIG. 3A, graph 302 illustrates traditional early (i.e., not late) random sampling techniques. This sampling not only significantly affects the shape of the distribution of flows 310, as shown at 320, but also eliminates most of the rare feature values indicated at 325 and 330 because the flows related to the eliminated values are missing in the sampled network traffic. Thus, if this sampling was used to attempt to discover malicious communications, the flows with rare feature values would not be represented. Since flows with rare feature values typically include malicious communication channels (i.e., these flows are part of C2 channels), it would be extremely difficult, if not impossible, to identify malicious communications based on the sampling represented by graph 302. By comparison, in FIG. 3B, graph 304 illustrates late sampling without any adaptive adjustments. Although this sampling reduces the bias in the feature distribution indicated at 320, many rare feature values are still missing from this sampling at 325 and 330.

In FIG. 3C, graph 306 illustrates late, adaptive sampling and the loss of rare feature values is nearly eliminated because the combination of adaptive and late sampling minimizes the bias of feature distributions important for identifying malicious communication channels (i.e., the feature distributions important for consequent C2 reconstruction). Late sampling allows the adaptive sampling to emphasize the conservation of the variability in the data, as the proportions have been conserved by feature extraction. In other words, late adaptive sampling retains maximum variability and minimum redundancy.

As discussed above, late, adaptive, flow-based sampling corrects an inherent bias in traditional (i.e., random) flow-based sampling methods (either towards over representing or under representing unique features) by capturing features of network traffic (i.e., statistics) prior to sampling. These features allow the sampling to be intentionally biased in a beneficial manner such that information that representative of unique flows in the network traffic is captured while representative information for common (and presumably legitimate) flows included in the network traffic is also captured. Thus, late, adaptive, flow-based sampling preserves the data distribution while reducing the size of the dataset, at least compared to other sampling techniques (i.e., random sampling), such as the techniques illustrated in FIGS. 3A and 3B. Consequently, malicious communications within network traffic can be effectively and efficiently identified with adaptive sampling. However, that being said, in other embodiments, other sampling methods could be used provided that the alternative sampling method can capture rare feature values and representative information for common flows in a similar manner to that shown in FIG. 3C.

Figure 4:
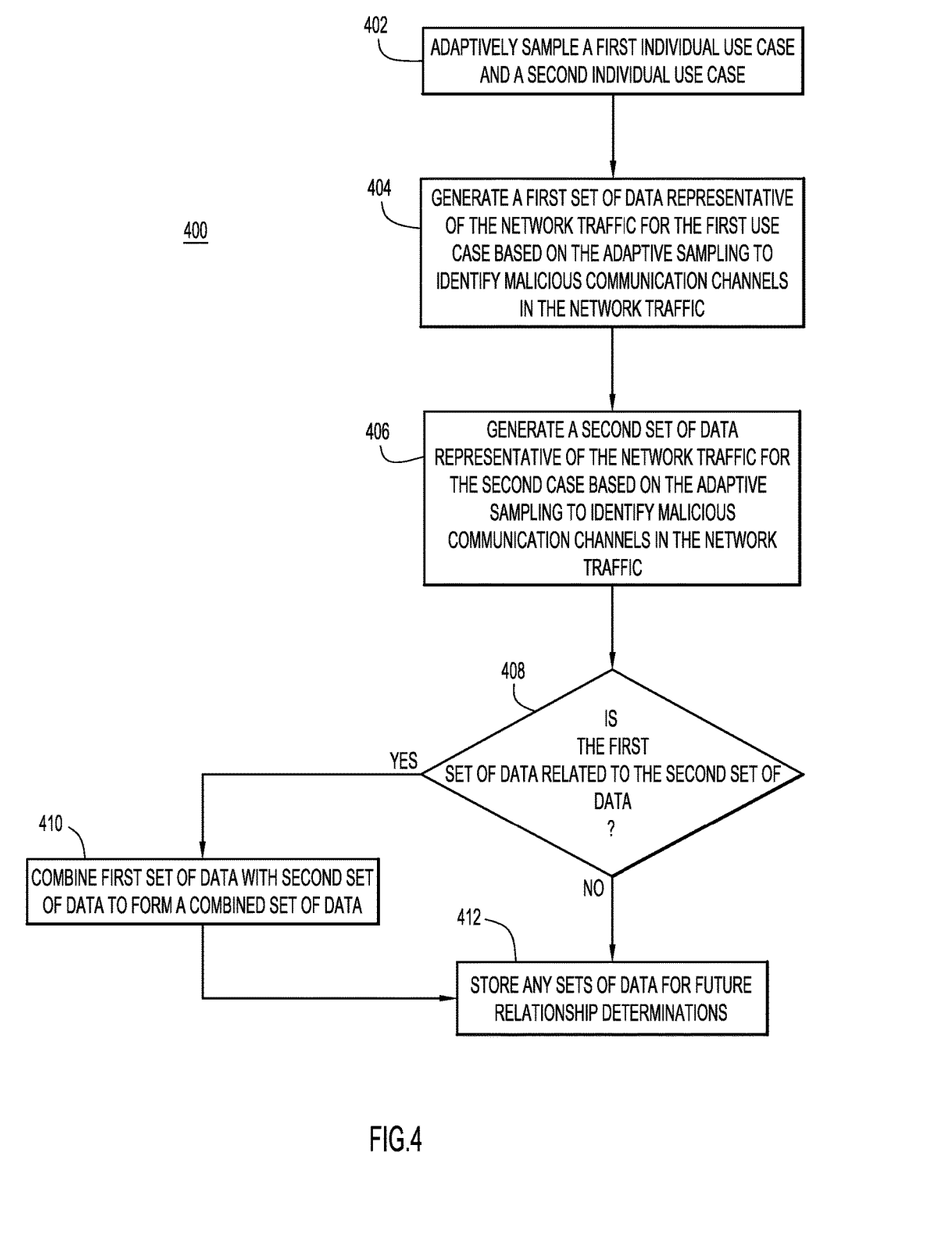
FIG. 4 is a flowchart illustrating a method for generating data representative of global network traffic based on adaptive sampling of individual use cases, according to an example embodiment.

Now referring to FIG. 4, method 400 depicts data generation and communication network construction methods. In some embodiments, these methods may be performed by communication network construction module 126 illustrated in FIG. 1. The method 400 depicted in FIG. 4 rescues any loss introduced during an individual sampling by correlating and combining data generated for various individual samples. The correlating and combining identifies at least some missing values by analyzing other individual sampling and data generation (i.e., sampling performed for other users from the same company) and combining related data. As is described in more detail below, various individual data sets may be determined to be related when the individual data sets share a predetermined number of communication channels.

First, at step 402, late adaptive sampling is applied to the network traffic for multiple individual use cases separately (i.e., to each company) in the same manner as is described above with regards to FIGS. 2, 3A, 3B, and 3C. This individual sampling preserves more malicious communication than random sampling, because the late, adaptive flow-based sampling samples flows having rare feature values with a higher frequency (malicious communication channels are typically related to flows with rare feature values) and samples flows with frequently used feature values (e.g. frequently used domains) with a smaller frequency.

At steps 404 and 406, data is generated that is representative of the communication channels in the networks of the individual use cases in the same manner as is described above with regards to FIGS. 2, 3A, 3B, and 3C. In particular, a first set of data is generated based on the adaptive sampling of the network traffic associated with the first individual (such as a user or a company) and a second set of data is generated based on the adaptive sampling of the network traffic associated with the second individual. Consequently, at steps 404 and 406, malicious traffic may be identified within each set of data.

At step 408, the first set of data may be compared to the second set of data in order to determine if the first set of data is related to the second set of data. In some embodiments, various detectors or classifiers are used to detect malicious (i.e., C2) communication channels in the first and second sets of data and the detected malicious communication channels in the first set of data are compared to the detected malicious communication channels in the second set of data. In these embodiments, the first set of data may be considered related to the second set of data if the two sets of data have a predetermined number of identified malicious communication channels in common (i.e., the two sets of data share a predetermined number of identified malicious communication channels). However, in other embodiments, two sets of data may be considered related if the two sets share a predetermined number or percentage of communication channels (both malicious and non-malicious) or satisfy some other predetermined threshold.

If related, the data sets from the related individual samplings (i.e., the first set of data and the second set of data) can be combined, at step 410, to form one overall data set and fill the missing values lost during the sampling process. Otherwise, the sampled network traffic can be stored at step 412 and queried upon any post-mortem investigation request, e.g. for network forensics purposes. If at some point in the future, the stored data is determined to be related to a new data set, the stored data set may be combined with the new data set to reconstruct the communication channels in the network traffic of the new data set, or at least the malicious communication channels. Moreover, in some embodiments, combined data sets (i.e., the data set created at step 410) may also be stored and compared to additional generated data sets. For example, if data sets generated for multiple users within an enterprise network are found related and combined, the combined data set can then be compared to data sets generated for another enterprise network to determine if the data sets are related. If a relationship exists, both enterprise networks may be under attack by similar botnets and, thus, the combined data set from the first enterprise network may help to identify malicious communication channels in the second enterprise network and vice versa.

Figure 5:
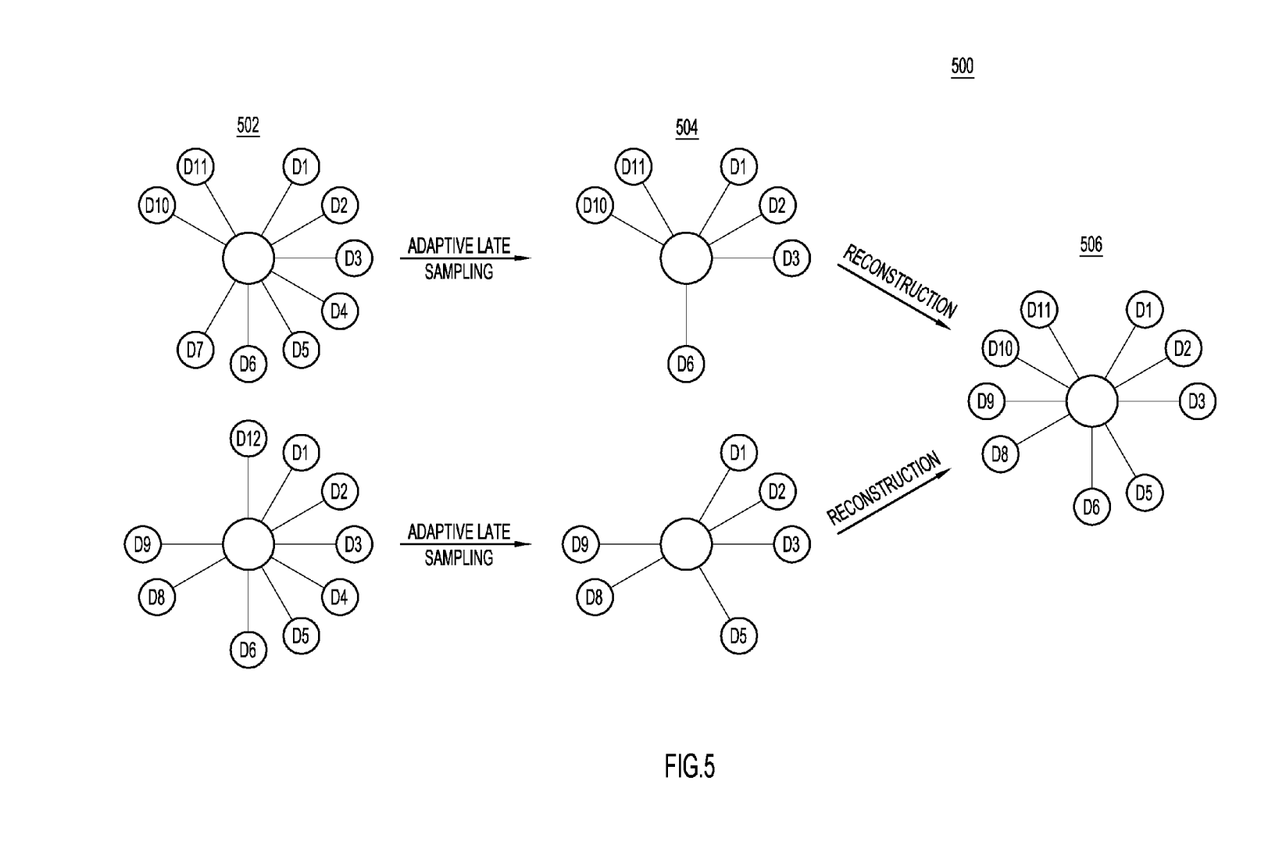
FIG. 5 is a diagram depicting a process for generating data representative of global network traffic based on adaptive sampling of individual use cases, according to an example embodiment.

Now referring to FIG. 5, but with continued reference to FIG. 4, diagram 500 depicts data generation methods, perhaps performed by communication network construction module 126, in accordance with the method 400 illustrated in FIG. 4. In diagram 500, the initial mappings shown at 502 illustrate all of the malicious network channels for a first user (U1) and a second user (U2). The first user U1 has malicious communication channels with domains D1-D7, D10, and D11 while the second user U2 has malicious communication channels with domains D1-D6, D8, D9, and D12. Thus, the first user U1 and second user U2 are both in communication with six of the same malicious domains (D1-D6), the first user U1 is in communication with three malicious domains (D7, D10, and D11) that the second user U2 is not in communication with, and the second user U2 is in communication with three malicious domains (D8, D9, and D12) that the first user U1 is not in communication with.

According to step 402 of FIG. 4, the network traffic of the first user U1 is adaptively sampled in order to attempt to identify the malicious domains with which the first user U1 is in contact (i.e., domains D1-D7, D10, and D11) while the network traffic of the second user U2 is adaptively sampled in order to attempt to identify the malicious domains with which the second user U2 is in contact (i.e., domains D1-D6, D98, D9, and D12). Although all of the malicious domains are shown at 502, the adaptive sampling is performed without full knowledge of all of the domains. Instead, the adaptive sampling attempts to identify all of the domains shown at 502. As shown at 504, in this example embodiment, the data generated based on the late, adaptive, flow-based sampling, per steps 404 and 406 of FIG. 4, identifies six of the nine malicious domains with which the first user U1 has communication channels (D1-D3, D6, D10, and D11) and identifies six of the nine malicious domains with which the second user U2 has communication channels (D1-D3, D5, D8, and D9).

In this embodiment, the set of data for the first user U1 is considered related to the second set of data for the second user U2 because they share malicious domains D1-D3. Consequently, the traffic of these two users is combined, per steps 408 and 410 of FIG. 4, in a reconstruction (or more accurately, a construction, since the complete original network traffic is unknown at the time of the data generation for the "reconstruction") of the network traffic. In this combining step, any overlapping communication channels are consolidated into a single channel while non-overlapping channels are combined, such that all sampled channels are represented, but not over-represented. As shown at 506, in the depicted embodiments, the reconstruction enables mapping of communication channels to D1-D3, D5-D6, and D8-D11, thereby revealing almost the entire C2 communication structure and only missing communication channels to domains D4, D7, and D12. Thus, combining the data generated based on the late, adaptive, flow-based sampling optimizes the performance of the system to detect and reconstruct malicious C2 channels.

Figure 6:
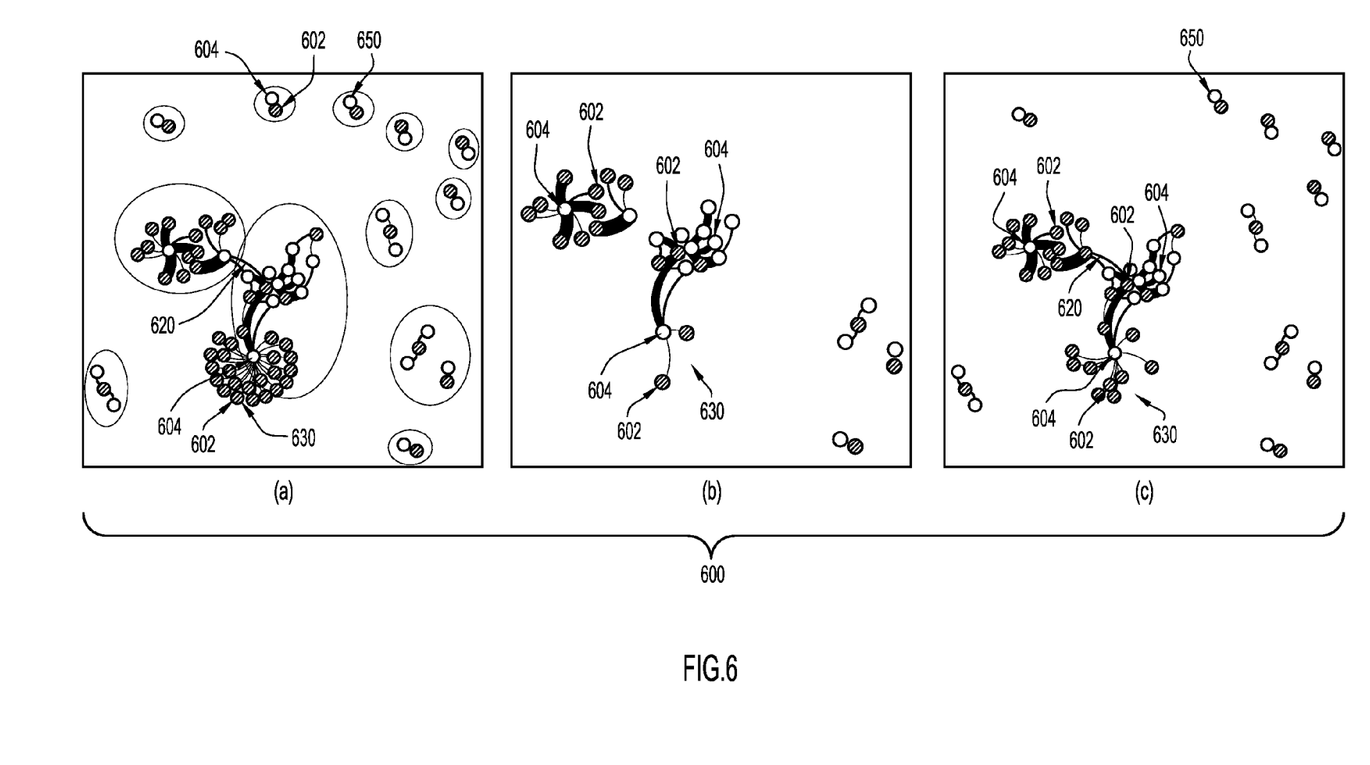
FIG. 6 is a diagram depicting a process for identifying malicious communication channels based on the generated data, according to an example embodiment.

Now referring to FIG. 6, diagram 600 illustrates malicious communication channels between attackers 602 (striped nodes) and infected hosts 604 (clear nodes). Portion (a) of diagram 600 illustrates malicious communication channels in the original data (i.e., no sampling), portion (b) of diagram 600 illustrates malicious communication channels detected in random sampling, and portion (c) of diagram 600 illustrates malicious communication channels detected with late, adaptive, flow-based sampling. The thickness of the connections represents the number of flows.

As can be seen, random sampling in portion (b) misses most of the individual attacks, such as the individual attack denoted at 650 and the connection 620 between the two large clusters of attacks is also lost. Moreover, in portion (b) only two malicious domains were retained from the group of domains 630 attacking a single user. By comparison, late, adaptive, flow-based sampling (shown in portion (c)) performs significantly better. Most of the individual attacks and the connection link 620 between the two large clusters are retained in portion (c). Also, more malicious domains were found from the group of domains 630 attacking a single user. Since retaining information like individual attacks, links between groups of attacks and the size of group attacks is important for tracking malicious communication channels, especially those associated with botnets, late, adaptive sampling provides a significant improvement to the field of network security.

More generally, the techniques provided herein provide a number of advantages. For example, techniques presented herein improve reconstruction of malicious behaviors for the purpose of network forensics and provide higher precision and recall of subsequent detectors or classifiers. Reconstruction is improved due to the increased percentage of malicious flows in the sampled set as compared to random sampling (by a combination of adaptively increasing the sampling rate for flows with rare feature values and correlation across the whole telemetry). This benefit does not depend on any specific detector. By comparison, the higher precision and recall is derived because the detectors or classifiers used to collect telemetry do not depend on features collected over the whole telemetry because the processing of these detectors/classifiers runs separately for each company. Instead, the detectors analyze data flows retrieved with sampling methods that depend on features collected over the whole flow.

As another example, the sampling techniques described herein decrease the size of the telemetry volume that is being processed and analyzed, with minimal impact on the efficacy of the subsequent C2 detection coverage and reconstruction. The impact is minimized because the sampling techniques presented herein significantly increase the percentage of malicious flows in the sampled set by sampling frequently used (legitimate) traffic with lower probability. Additionally, late, adaptive, flow-based sampling keeps a sufficient number data flows to produce overlap between infection cases observed on different networks so that infection cases can be easily matched together and aggregate models that cover the flows/connections missing from individual user's cases can be built. Thus, the proposed optimization improves the reconstruction of malicious traffic not only related to C2 detection, but also against a wide variety of attack techniques. Due to at least the advantages, the techniques described herein will enable enhanced telemetry collection and will provide better threat intelligence at lower cost. Still further, the techniques provided herein may be beneficial when implemented with proxy logs because sophisticated methods with high computational complexity are frequently not compatible with proxy logs.

To summarize, in one form, a method is provided comprising: at a computing device having connectivity to a network, obtaining a set of data flows representing network traffic between one or more nodes in the network and one or more domains outside of the network, each data flow in the set of data flows including a plurality of data packets; extracting one or more features from the set of data flows based on statistical measurements of the set of data flows; adaptively sampling the set of data flows based on at least the one or more features; and generating data representative of the network traffic based on the adaptively sampling to identify malicious communication channels in the network traffic.

In another form, a system is provided comprising: a network including a plurality of nodes; and a computing device having connectivity to the network and configured to: obtain a set of data flows representing network traffic between one or more nodes in the network and one or more domains outside of the network, each data flow in the set of data flows including a plurality of data packets; extract one or more features from the set of data flows based on statistical measurements of the set of data flows; adaptively sample the set of data flows based on at least the one or more features; and generate data representative of the network traffic based on the adaptively sampling to identify malicious communication channels in the network traffic.

In yet another form, a non-transitory computer-readable storage media is provided encoded with software comprising computer executable instructions and when the software is executed operable to: obtain a set of data flows representing network traffic between one or more nodes in the network and one or more domains outside of the network, each data flow in the set of data flows including a plurality of data packets; extract one or more features from the set of data flows based on statistical measurements of the set of data flows; adaptively sample the set of data flows based on at least the one or more features; and generate data representative of the network traffic based on the adaptively sampling to identify malicious communication channels in the network traffic.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   at a computing device having connectivity to a network, obtaining a set of data flows representing network traffic between one or more nodes in the network and one or more domains outside of the network, each data flow in the set of data flows including a plurality of data packets;
   extracting one or more features from the set of data flows based on statistical measurements of the set of data flows;
   analyzing the one or more features extracted from a plurality of data flows in the set of data flows to identify statistically rare data flows in the set of data flows;
   subsequent to the analyzing, adaptively sampling the set of data flows by selecting specific whole flows included in the set of data flows based on the analyzing, wherein the selecting generates an enriched random sample of the set of data flows by deliberately skewing a distribution of a random sample to cover the statistically rare data flows included in the set of data flows; and
   generating data representative of the network traffic based on the adaptively sampling to identify malicious communication channels in the network traffic.

2. The method of claim 1, wherein the malicious communication channels are associated with a command and control network.

3. The method of claim 1, wherein the generating data further comprises:
   generating a first set of communication mappings representative of network traffic for a first user in the network;
   generating a second set of communication mappings representative of network traffic for a second user in the network; and
   combining the first set of communication mappings and the second set of communication mappings when the first set of communication mappings is related to the second set of communication mappings.

4. The method of claim 3, wherein the first set of communication mappings is related to the second set of communication mappings when the first set of communication mappings and the second set of communication mappings have a predetermined number of the malicious communication channels in common.

5. The method of claim 1, wherein the statistical measurements comprise at least one of: source Internet Protocol (IP) address of the data flow, destination IP address of the data flow, source port of the data flow, destination port of the data flow, protocol of the data flow, number of data packets transferred in the data flow, and timestamp of the data flow.

6. The method of claim 1, wherein the one or more features comprise:
   one or more count features that indicate a number of data flows that are related based on the statistical measurements.

7. The method of claim 1, wherein the one or more features comprise:
   one or more entropy features that indicate entropy of a statistical measurement over the set of data flows.

8. A system comprising:
   a network including a plurality of nodes; and
   a computing device having connectivity to the network and configured to:

obtain a set of data flows representing network traffic between one or more nodes in the network and one or more domains outside of the network, each data flow in the set of data flows including a plurality of data packets;

extract one or more features from the set of data flows based on statistical measurements of the set of data flows;

analyze the one or more features extracted from a plurality of data flows in the set of data flows to identify statistically rare data flows in the set of data flows;

subsequent analysis of the one or more features, adaptively sample the set of data flows by selecting specific whole flows included in the set of data flows based on the analysis of the one or more features, wherein the selecting generates an enriched random sample of the set of data flows by deliberately skewing a distribution of a random sample to cover the statistically rare data flows included in the set of data flows; and generate data representative of the network traffic based on the adaptively sampling to identify malicious communication channels in the network traffic.

9. The system of claim 8, wherein the malicious communication channels are associated with a command and control network.

10. The system of claim 8, wherein the computing device is further configured to:
generate a first set of communication mappings representative of network traffic for a first user in the network;
generate a second set of communication mappings representative of network traffic for a second user in the network; and
combine the first set of communication mappings and the second set of communication mappings when the first set of communication mappings is related to the second set of communication mappings.

11. The system of claim 10, wherein the first set of communication mappings is related to the second set of communication mappings when the first set of communication mappings and the second set of communication mappings share a predetermined number of the malicious communication channels.

12. The system of claim 8, wherein the statistical measurements comprise at least one of: source Internet Protocol (IP) address of the data flow, destination IP address of the data flow, source port of the data flow, destination port of the data flow, protocol of the data flow, number of data packets transferred in the data flow, and timestamp of the data flow.

13. The system of claim 8, wherein the one or more features comprise:
one or more count features that indicate a number of data flows that are related based on the statistical measurements.

14. The system of claim 8, wherein the one or more features comprise:
one or more entropy features that indicate entropy of a certain statistical measurement over the set of data flows.

15. A non-transitory computer-readable storage media encoded with software comprising computer executable instructions and when the software is executed operable to:

obtain a set of data flows representing network traffic between one or more nodes in a network and one or more domains outside of the network, each data flow in the set of data flows including a plurality of data packets;

extract one or more features from the set of data flows based on statistical measurements of the set of data flows;

analyze the one or more features extracted from a plurality of data flows in the set of data flows to identify statistically rare data flows in the set of data flows;

subsequent analysis of the one or more features, adaptively sample the set of data flows by selecting specific whole flows included in the set of data flows based on the analysis of the one or more features, wherein the selecting generates an enriched random sample of the set of data flows by deliberately skewing a distribution of a random sample to cover the statistically rare data flows included in the set of data flows; and generate data representative of the network traffic based on the adaptively sampling to identify malicious communication channels in the network traffic.

16. The non-transitory computer-readable storage media of claim 15, wherein the malicious communication channels are associated with a command and control network.

17. The non-transitory computer-readable storage media of claim 15, wherein the instructions operable to generate further comprise instructions operable to:
generate a first set of communication mappings representative of network traffic for a first user in the network;
generate a second set of communication mappings representative of network traffic for a second user in the network; and
combine the first set of communication mappings and the second set of communication mappings when the first set of communication mappings is related to the second set of communication mappings.

18. The non-transitory computer-readable storage media of claim 17, wherein the first set of communication mappings is related to the second set of communication mappings when the first set of communication mappings and the second set of communication mappings share a predetermined number of the malicious communication channels.

19. The non-transitory computer-readable storage media of claim 15, wherein:
the statistical measurements comprise at least one of: source Internet Protocol (IP) address of the data flow, destination IP address of the data flow, source port of the data flow, destination port of the data flow, protocol of the data flow, number of data packets transferred in the data flow, and timestamp of the data flow.

20. The non-transitory computer-readable storage media of claim 15, wherein the one or more features comprise at least one of:
one or more count features that indicate a number of data flows that are related based on the statistical measurements; and
one or more entropy features that indicate entropy of a certain statistical measurement over the set of data flows.

* * * * *